United States Patent [19]

Adolphson et al.

[11] Patent Number: 5,297,318
[45] Date of Patent: Mar. 29, 1994

[54] ATTACHABLE UTILITY DEVICES

[76] Inventors: Bradley K. Adolphson, 2434 W. 3965 So., West Valley City, Utah 84119; Brett W. Adolphson, 8565 So. Kings Cove Dr., Salt Lake City, Utah 84121

[21] Appl. No.: 937,145

[22] Filed: Aug. 31, 1992

[51] Int. Cl.5 .................................................. A45F 5/00
[52] U.S. Cl. .................................. 24/3 R; 24/35; 224/148; 224/269
[58] Field of Search ............... 24/3 R, 3 A, 3 J, 11 R, 24/11 CT, 11 CC, 3 F; 224/252, 269, 148, 151

[56] References Cited

U.S. PATENT DOCUMENTS

| | | | |
|---|---|---|---|
| 463,351 | 11/1891 | Elliott | 24/11 CT |
| 1,281,025 | 10/1918 | Klein | 24/3 A |
| 1,935,312 | 11/1933 | Cook | 24/3 R |
| 4,088,250 | 5/1978 | Schaefer | 224/252 |
| 4,215,873 | 8/1980 | Price | 24/3 J |
| 4,453,656 | 6/1984 | Gillum | 224/269 |
| 4,718,586 | 1/1988 | Hagino | 224/269 |
| 5,016,326 | 5/1991 | Goldenberg | 24/3 J |
| 5,038,985 | 8/1991 | Chapin | 24/3 J |
| 5,056,696 | 10/1991 | Lahr | 224/148 |

*Primary Examiner*—Victor N. Sakran
*Attorney, Agent, or Firm*—Robert M. Sperry

[57] ABSTRACT

A plurality of utility devices which are each formed for a respective purpose, such as belt clips, handles and the like, and which are releasably attachable to attaching members which are fixedly secured to substantially any desired object to provide added usefulness and utility to the desired object.

9 Claims, 4 Drawing Sheets

ATTACHABLE UTILITY DEVICES

BACKGROUND

1. Field of Invention

This invention relates to utility devices and is particularly directed to a plurality of utility devices which are each formed for a respective purpose, such as belt clips, handles and the like, and which are releasably attachable to attaching members which are fixedly secured to substantially any desired object to provide added usefulness and utility to the desired object.

2. Prior Art

Many times people encounter objects which they feel could be much more useful, if they had a handle, clip or the like which, unfortunately, they do not have. This is generally a personal matter and the desirability of such a handle or clip may vary from person to person. For example, insulated covers for beverage containers are generally not provided with handles or clips for attaching the cover to a bicycle, wheel chair, window ledge, fence or the like. The reason that such handles or clips are not provided may be added cost of production, need for larger packaging, display space, etc. Furthermore, many people are satisfied to grip the beverage cover with their hands for drinking and to set it on a table or the ground, when they are not drinking from it. On the other hand, there are many other people who would prefer to have a handle for gripping the beverage cover or who would like to be able to releasably attach the beverage cover to a bicycle or the like, when they are not drinking from it. Many prior art devices have been proposed to overcome such problems. However, most of the prior art devices have been capable of serving only one specific purpose. Thus, holders have been provided, into which insulated beverage covers may be inserted, and these holders frequently have handles. On the other hand, these holders have no provision for attaching the beverage cover to a bicycle or wheel chair. Again, clips have been provided for releasably attaching beverage containers to bicycles or wheel chairs, but these clips do not have handles for use when drinking from the container. In the same light, belt clips have been proposed for releasably attaching a beverage container to the user's belt, but these belt clips are not adaptable for attaching the beverage container to a beach chair or boat railing. Numerous other instances will come immediately to mind in which the user may wish to adapt substantially any given object in a manner which the manufacturer did not contemplate or chose to ignore.

In a related vein, campers, backpackers and the like often desire to attach a plurality of duffle bags, knapsacks, tents and the like together, although the manufacturers often have not provided straps or attaching means for accomplishing this. In the past, such problems have been solved by employing ropes, belts, straps or the like to tie the desired objects together as best they could. More recently, Nexus Company, whose address is 230 W. Gerry Drive, Wooddale, Ill. 60191, has developed connecting devices, called "lash points", comprising plastic rectangles, which may be sewn or otherwise fixedly secured to a desired object and which have a plurality of slits provided along the edges of the rectangles through which belts or straps may be passed to facilitate tying the desired object to another object. However, no means has been provided which will enable these lash points to serve in adapting a desired object for a plurality of purposes, as discussed above. Thus, none of the prior art attaching devices have been entirely satisfactory.

BRIEF SUMMARY AND OBJECTS OF INVENTION

In accordance with the present invention, a rectangular attaching member is provided having a plurality of slits formed along the edges thereof, together with a plurality of utility devices, such as clips, handles and the like, which are releasably engageable with the slits of the attaching member. The attaching member may be attached to substantially any desired object and the utility devices of the present invention may then be releasably mounted on the desired object to adapt the desired object for a desired purpose. Moreover, the utility devices of the present invention are interchangeable. Thus, once the attaching member has been attached, a handle, embodying the present invention, may be releasably mounted on the object to facilitate handling. Subsequently, if desired, the handle, embodying the present invention, could be replaced by a belt clip, embodying the present invention, to allow the user to hang the desired object from their belt. Moreover, by attaching the attaching members to a plurality of desired objects, a given utility device, embodying the present invention, may be interchangeably mounted on any one of the desired objects.

Accordingly, it is an object of the present invention to provide improved attaching and utility devices.

Another object of the present invention is to provide improved utility devices which are interchangeably attachable to attaching members to permit adapting a desired object for a variety of purposes.

An additional object of the present invention is to provide attaching members and utility devices which may be releasably mounted on a desired object.

A further object of the present invention is to provide attaching members and utility devices which may be interchangeably mounted on any of a plurality of desired objects.

A specific object of the present invention is to provide a rectangular attaching member having a plurality of slits formed along the edges thereof and which is fixedly securable to a desired object, together with a plurality of utility devices, such as clips, handles and the like, which are releasably engageable with the slits of said attaching member to adapt the desired object for a given purpose.

These and other objects and features of the present invention will be apparent from the following detailed description, taken with reference to the figures of the accompanying drawings.

BRIEF DESCRIPTION OF THE DRAWING

FIG. 6 is a plan view of a utility device, embodying the present invention, for use with either the four-slit attaching member of FIGS. 1 and 2 or the eight-slit attaching member of FIG. 3 to allow a desired object to be releasably clipped to a bicycle frame or the like;

FIG. 9 is a side view of a utility device, embodying the present invention, for use with either of the attaching members of FIG. 1 or FIG. 3 to permit hanging a desired object from a vehicle window or the like.

DETAILED DESCRIPTION OF THE INVENTION

Figures 1, 2:
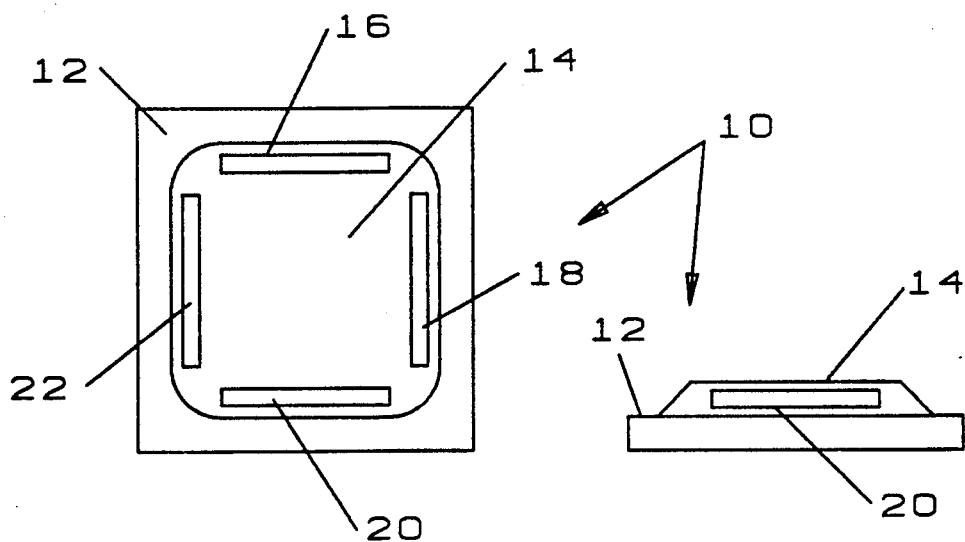
FIG. 1 is a plan view of a four-slit attaching member for use with the utility devices of the present invention.
FIG. 2 is a side view of the attaching member of FIG. 1.
Figure 3:
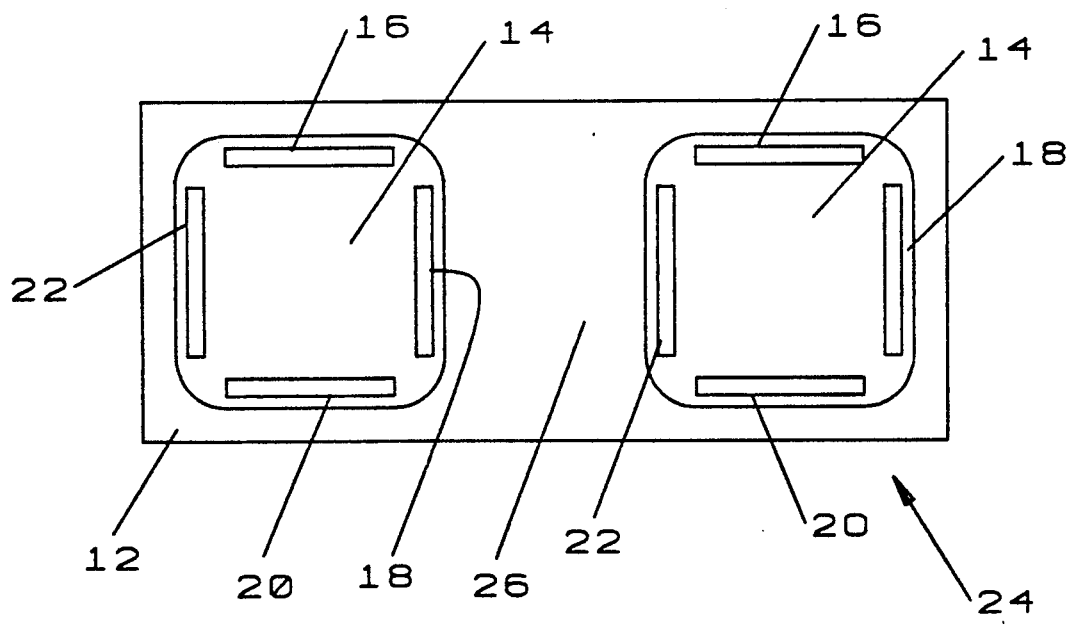
FIG. 3 is a plan view of an eight-slit attaching member for use with the utility devices of the present invention.
Figure 4:
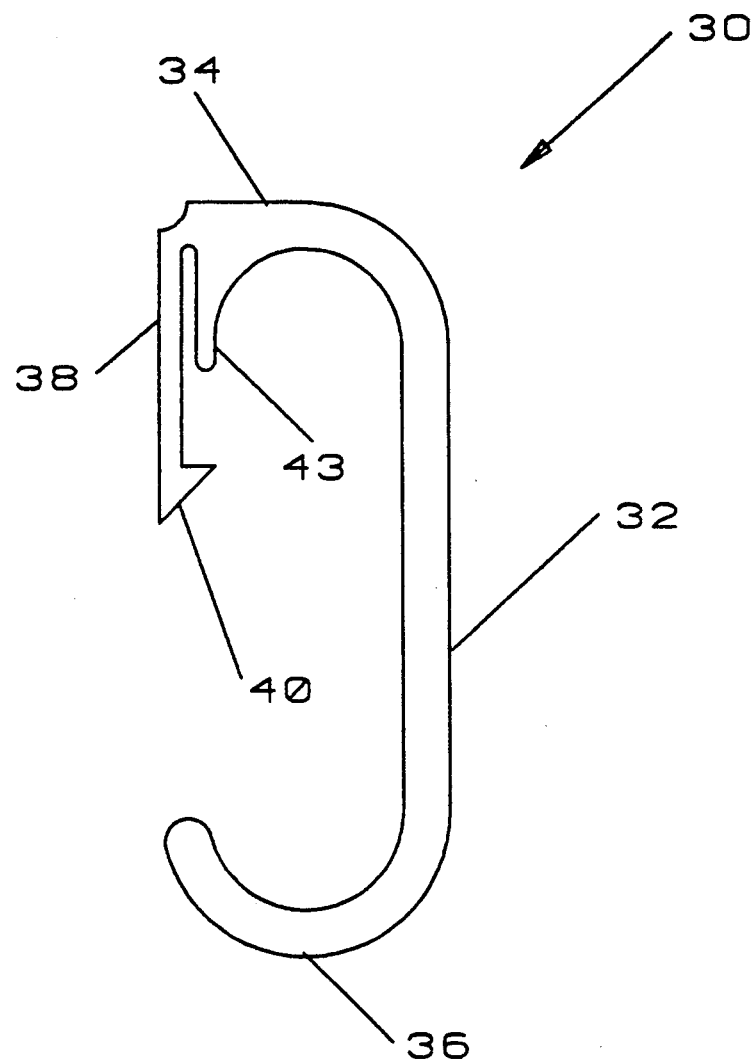
FIG. 4 is a side view of a utility device, embodying the present invention, for use as a handle.
Figure 5:
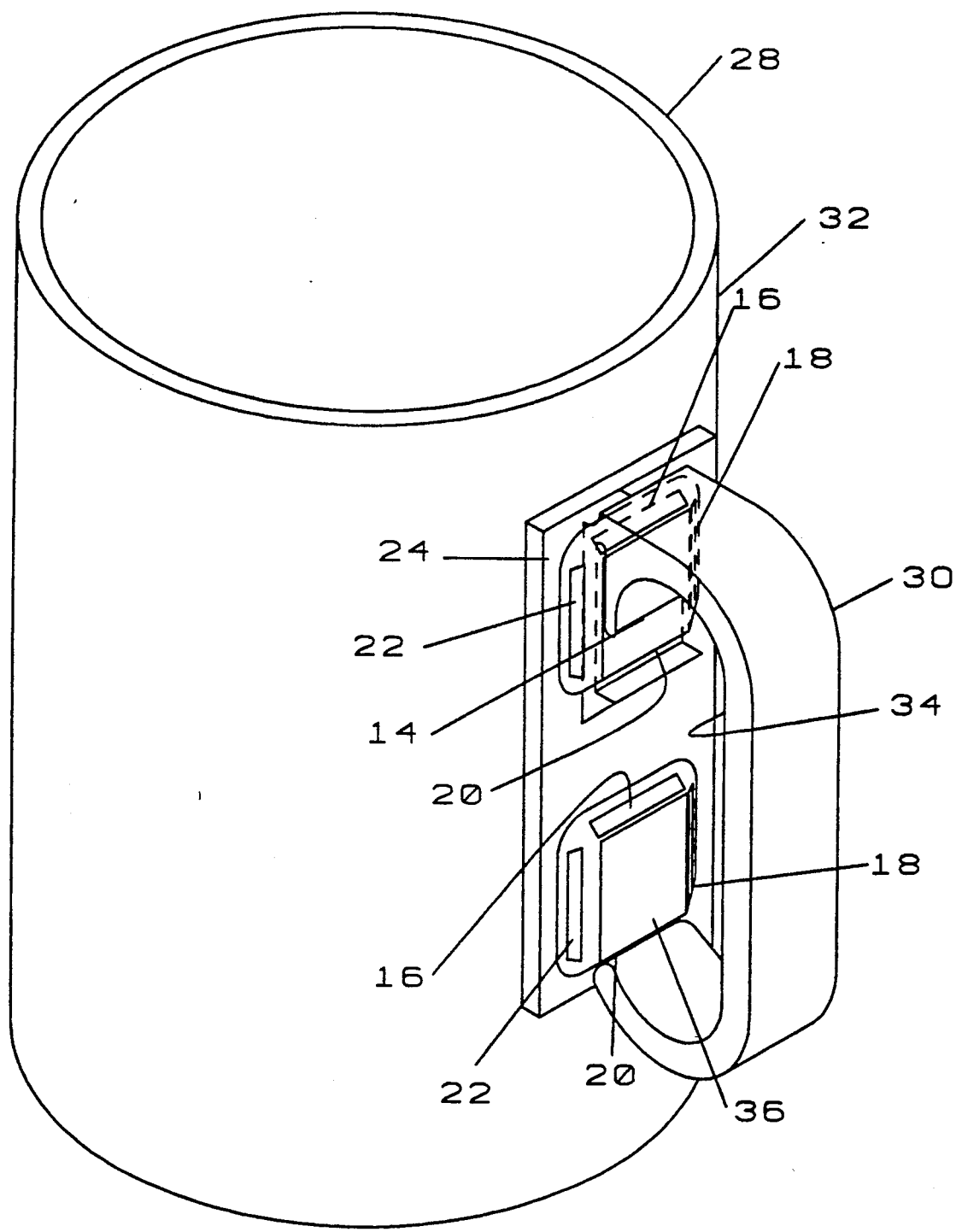
FIG. 5 is an isometric view of a beverage cooler cover having the handle device of FIG. 4 releasably secured thereto by means of either the four-slit attaching member of FIGS. 1 and 2 or the eight-slit attaching member of FIG. 3.

In those forms of the present invention chosen for purposes of illustration in the drawings, FIGS. 1 and 2 show an attaching member, indicated generally at 10, which is rectangular in shape and has a peripheral flange 12 with a raised central portion 14 with a plurality of slits extending along the edges of the raised portion 14, as seen at 16, 18, 20 and 22. If necessary or desirable, a larger attaching member 24 may be provided, as seen in FIG. 3, having a peripheral flange 12 and two raised portions 14 with slits 16, 18, 20 and 22 extending along the edges of the raised portions 14. If desired, a central spacing area may be provided, as seen at 26. The attaching members 10 or 24 may be formed of metal or plastic and may be mounted on any desired object by securing the peripheral flange 12 to the desired object by substantially any desired technique, such as soldering, welding, gluing, sewing or the like. Thus, FIG. 5 shows a beverage cooler cover, indicated generally at 28, having an attaching member, such as the attaching member 24 of FIG. 3, mounted thereon, by any suitable means, and having a utility device 30, as seen in FIG. 4, releasably attached to the attaching member 24. As seen in FIG. 4, the utility device 30 is a generally U-shaped 32 member having upper and lower arms 34 and 36 with a downwardly turned flange 38 projecting from the arm 34 of the utility device 30. The flange 38 is insertable through upper slit 16 of either the four-slit attaching member 10 or the eight-slit attaching member 24 and is formed with a generally triangular tip 40 which projects out of lower slit 20 and serves to releasably secure the utility device 30 to the attaching member 10 or 24. Also, the utility device 30 is formed with an inner flange 43 which engages the raised surface 14 of the attaching member 10 or 24 to provide additional support for the utility device 30.

Figure 6:
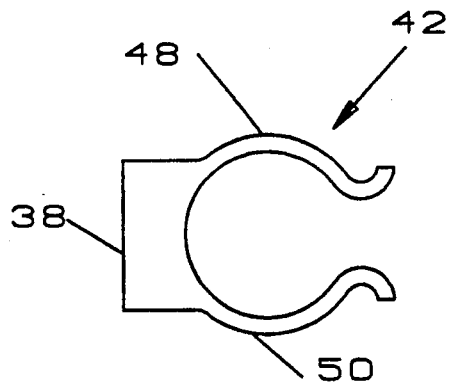
Figure 7:
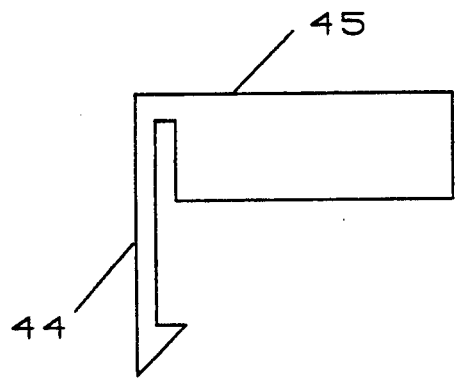
FIG. 7 is a side view of the utility device of FIG. 6.
Figure 8:
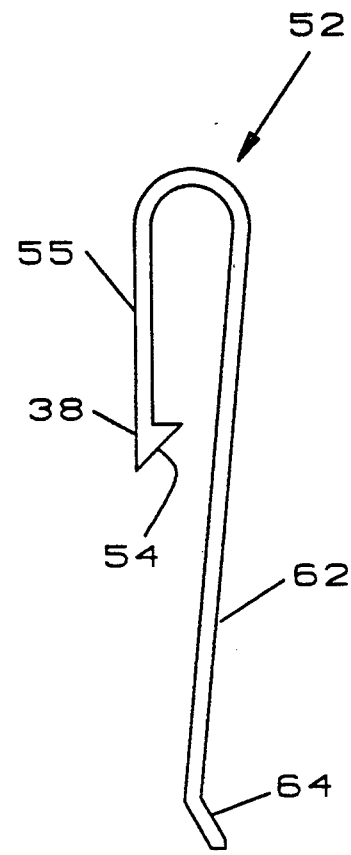
FIG. 8 is a side view of a utility device, embodying the present invention, for use with either of the attaching members of FIG. 1 or FIG. 3 to permit hanging a desired object from the user's belt.
Figure 9:
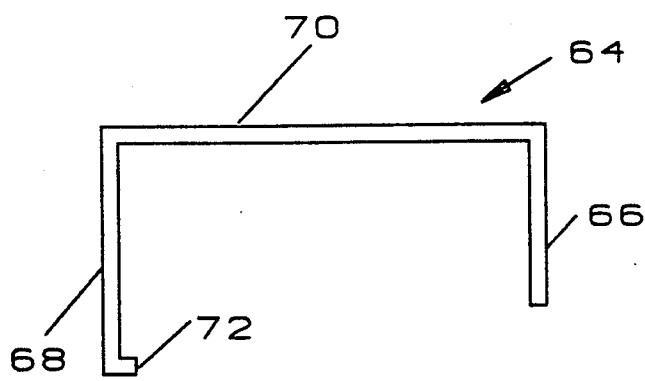

Similarly, FIGS. 6 and 7 show a utility device 42, for use with either the attaching member 10 of FIG. 1 or the attaching member 24 of FIG. 3, to allow the beverage cooler cover 28 to be releasably attached to a tube, such as a bicycle frame, not shown. The utility device 42 is formed with a rearwardly facing flange 44, similar to flange 38 of FIG. 4, which projects rearwardly from the upper edge 45 of of the utility device 42 and which is releasably insertable into the slit 16 of the attaching members 10 or 24 to mount the utility device 42 on a desired object and has a pair of resilient arms 48 and 50 which project forwardly and inwardly to releasably retain a tube, such as a bicycle frame inserted between the arms 48 and 50 and, hence, to permit the object on which the attaching member 10 or 24 is mounted to be releasably attached to the bicycle frame. Also, FIG. 8 shows a utility device 52, which is generally in the shape of an inverted J and has a triangular tip 54 projecting from the lower end of the relatively short leg 55. Leg 55 and tip 54 correspond to the flange 38 and tip 40 of the utility device 30 of FIG. 4 and are formed for insertion into one of the slits 16 of the attaching members 10 or 24. The utility device 52 also has a a relatively long leg 62 formed with an outwardly flared lower end 64 and connected at its upper end to the upper end of the short leg 55. By inserting the upper portion 56 of the flange 54 into slit 16 of one of the attaching members 10 or 24, the utility device 52 enables the user to hang the desired object from his belt by inserting the long leg 62 of the utility device 52 inside the user's belt. Finally, FIG. 8 shows a utility device 64 having vertical legs 66 and 68 connected at their upper end to respective ends of a horizontal leg 70 and leg 68 has an inwardly directed projection 72, corresponding to the triangular tip 40 of flange 38 of the utility device 30 of FIG. 4.

In use, the beverage cooler cover 28, with the attaching member 24 mounted thereon, may be used in any conventional manner. However, if the user prefers to have a handle to facilitate drinking from the cooler cover 28, the user may apply the utility device 30 by inserting the flange 38 of upper arm 34 in the uppermost slit 16 of the attaching member 24. When this is done, the user may use the utility device 30 as a handle to facilitate drinking from the cooler cover 28. By inserting leg 66 of the utility device 64 into slit 16 of one of the attaching members 10 or 24, the utility device 64 enables the user to hang the desired object from a vehicle window, not shown, by placing the horizontal leg 70 across the top of the window pane so that the vertical leg 66 projects downwardly on the opposite side of the window pane.

In use, the user fixedly secures one of the attaching devices 10 or 24 to a desired object, such as the beverage cooler cover 28 shown in FIG. 5, using any suitable securing technique as discussed above. Thereafter, the user may interchangeably attach any of the utility devices 32, 42, 52 or 62, by inserting the flanges 38, 44, 55 or 68 into the appropriate slits 16, 18, 20 and 22 of the attaching member 10 or 24. Thus, utility device 32 of FIG. 1 may be releasably attached to the attaching member 10 or 24 to provide a handle for the desired object, such as the beverage cooler cover 28, to facilitate drinking from the cooler cover 28. Subsequently, if desired, utility device 32 of FIG. 1 may be removed and utility device 42 of FIG. 6 may be attached to the attaching member 10 or 24 to enable the desired object, such as cooler cover 28, to be releasably secured to a bicycle frame or the like. Alternatively, if desired, the user may replace the utility device 42 of FIG. 6 with the utility device 64 of FIG. 8 to enable the user to support the desired object, such as cooler cover 28, from the window of a vehicle. Again, if desired, the user may replace the utility device 64 of FIG. 8 with the utility device 52 of FIG. 7 to enable the user to hang the cooler cover 28 from the user's belt.

Furthermore, it will be apparent that a plurality of the attaching members 10 and 24 may be provided and may be fixedly secured to a plurality of desired objects, such as golf bags, brief cases, etc. and that the utility devices 32, 42, 52 and 64 may be interchangeably secured to any of these objects, as desired. Moreover, many other utility devices may be provided and may be interchangeably secured to the attaching members 10 or 24 to perform substantially any desired task without departing from the spirit of the present invention. Therefore, it should be clearly understood that the forms of the present invention described above and shown in the figures of the accompanying drawings are illustrative only and are not intended to limit the scope of the present invention.

What is claimed is:

1. An attachable utility device comprising:
   a rectangular attaching member having raised central portions which is fixedly securable to a desired object and formed with a plurality of opposing pairs of slits extending along the edges of said raised central portions, and
   a utility device having means releasably engageable with a respective pair of said slits to attach said utility device to said desired object.

2. The device of claim 1 further comprising:
   a plurality of said utility devices each formed for releasable engagement with said attaching member and each formed to adapt said desired object for a respective purpose.

3. The device of claim 2 wherein:
   each of said plurality of said utility devices is interchangeably releasably securable to said attaching member to adapt said desired object for a respective purpose.

4. The device of claim 1 wherein:
   said utility device is formed with a flange releasably insertable into said slits to releasably attach said utility device to said attaching member.

5. The device of claim 1 wherein:
   said utility device is a handle.

6. The device of claim 5 wherein:
   said handle is generally U-shaped having upper and lower arms and having means carried by at least one of said arms for releasable retention by said attaching member.

7. The device of claim 1 wherein:
   said utility device is formed with a pair of forwardly and inwardly facing resilient arms for releasable engagement with a tubular article and having rearwardly facing means for releasable engagement with said attaching member.

8. The device of claim 1 wherein:
   said utility device is formed with a vertical leg, a horizontal leg connected to the upper end of said vertical leg, and means carried by the free end of said horizontal leg for releasably securing said utility device to said attaching member.

9. The device of claim 1 wherein:
   said utility device has a relatively short vertical leg, a relatively long leg connected at its upper end to the upper end of said short leg, and means carried by the free end of said short leg for releasable retention by said attaching member.

* * * * *